(12) United States Patent
Buse et al.

(10) Patent No.: US 6,894,820 B2
(45) Date of Patent: May 17, 2005

(54) NON-LINEAR INCREASE IN PHOTOSENSITIVITY OF PHOTOREFRACTIVE MATERIALS

(75) Inventors: Karsten Buse, Georgsmarienhuette (DE); Marc Luennemann, Werlte (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 10/211,768

(22) Filed: Aug. 1, 2002

(65) Prior Publication Data

US 2004/0021925 A1 Feb. 5, 2004

(30) Foreign Application Priority Data

Aug. 1, 2001 (DE) .......................................... 101 37 550

(51) Int. Cl.⁷ ................................................ G02F 1/07
(52) U.S. Cl. ...................................... 359/241; 359/245
(58) Field of Search ................................ 359/241, 245, 359/276, 279, 249, 288, 558, 484, 322, 3, 4, 6, 7

(56) References Cited

U.S. PATENT DOCUMENTS

| | | | | |
|---|---|---|---|---|
| 4,807,970 A | * | 2/1989 | Dube et al. | 359/7 |
| 5,422,873 A | * | 6/1995 | Kewitsch et al. | 369/103 |
| 5,440,669 A | * | 8/1995 | Rakuljic et al. | 359/7 |
| 5,508,829 A | * | 4/1996 | Freeouf et al. | 359/3 |
| 5,521,743 A | * | 5/1996 | Holmes et al. | 359/248 |
| 5,684,611 A | * | 11/1997 | Rakuljic et al. | 359/7 |
| 6,549,323 B1 | * | 4/2003 | Hunt | 359/279 |
| 6,577,591 B2 | * | 6/2003 | Hirao et al. | 369/276 |

* cited by examiner

Primary Examiner—Hung Xuan Dang
Assistant Examiner—Tuyen Tra
(74) Attorney, Agent, or Firm—Kenyon & Kenyon

(57) ABSTRACT

A method of and/or device for writing to an optical modulator using electromagnetic write beams, the modulator having a photorefractive converter body in which the space-modulated write beam may induce changes in the refractive index. An external voltage may be applied to the converter body. The intensity of the external voltage may be selected within a voltage range in which the buildup of changes in the refractive index may be accelerated by an increase in the charge carrier mobility or charge carrier density.

16 Claims, 1 Drawing Sheet

NON-LINEAR INCREASE IN PHOTOSENSITIVITY OF PHOTOREFRACTIVE MATERIALS

FIELD OF THE INVENTION

The present invention relates to a method and device of writing to an optical modulator using electromagnetic write beams, the modulator having a photorefractive converter body in which the space-modulated write beam may induce changes in the refractive index.

RELATED TECHNOLOGY

The photorefractive effect was apparently discovered in about 1966 in lithium niobate (LiNbO$_3$) by Ashkin et al. at Bell Laboratories. Shortly thereafter, the effect was recognized to be useful for storing volume phase holograms. The mechanism of the photorefractive effect may be explained as follows: crystals are illuminated with a light pattern, e.g., the interference pattern of two laser beams. As a result, charges are excited in the bright areas of the defects in the conduction band or valence band, redistributed, and recaptured preferentially in the darker areas. Space charge patterns are formed and modulate the refractive index via the electrooptic effect. Charge sources and charge traps often may be transition metal ions which occur in different valence states. Diffusion, the volume photovoltaic effect, and drift in external fields, in space charge fields and pyroelectric fields are known as drive mechanisms for the charge transfer.

Changes in the refractive index can be detected via light diffraction, for example. For this purpose, plane waves are brought to interference and sinusoidal phase gratings are written, on which the light of a read beam is diffracted. For a not excessively thick (i.e., strong) grating, the diffraction efficiency, i.e., the ratio of the intensity of the diffracted light to that of the incident light, increases proportionally to the square of the amplitude of the refractive index modulation. In photorefractive crystals, at the beginning of the write process the diffraction efficiency increases proportionally to the square of time and light intensity. It also increases proportionally to the square of the sample thickness. A parameter normalized to time, light intensity, and sample thickness may be introduced as sensitivity (photosensitivity). For practical applications, high sensitivity values are purportedly desirable in order to achieve high diffraction efficiencies with a small amount of light, in a short time, and in relatively thin samples.

Two parameters are purportedly decisive for the sensitivity of photorefractive materials: the saturation value of the change in refractive index and the time constant with which this saturation value is reached. This time constant may be given by the formula $\tau = \epsilon \epsilon_0 / \sigma$, where $\epsilon$ is the dielectric constant, $\epsilon_0$ is the dielectric constant of the vacuum, and $\sigma$ is the electrical conductivity of the material. Electrical conductivity, in turn, may be given by the formula $\sigma = e \mu N$, where e is the elementary charge, $\mu$ is the charge carrier mobility, and N is the thickness (or density) of the freely mobile charge carriers. For high sensitivity, time constant $\tau$ should be small. Small time constants require high conductivity, which is achievable via a high sensitivity (i.e., mobility) and a high density of the mobile charge carriers. Optimization of these parameters by selecting a suitable host crystal and suitable dopants, among other things, may be available from the related art.

In addition to available applications of photorefractive crystals in photodetectors which convert light into an electrical signal, many other applications of photorefractive crystals in the area of optical modulators have been studied. However, at this time there are still few commercial products. Thus, Bragg wavelength filters have been manufactured for optical communications and astronomy. In addition, photorefractive gratings have been used to manufacture integrated optical DBR LiNbO$_3$ lasers. Volume holographic data storage and optical phase conjugation are purportedly particularly promising fields of application.

One, thus far, unresolved problem is, however, insufficient sensitivity. Two factors contribute to the low sensitivity of photorefractive crystals. First, only a portion of the absorbed photons detaches charge carriers from the defects, while most of the light appears to cause short-time excitation, but is then converted into phonons by non-radiant recombination. Second, the transfer length of the charges is small and amounts to only a few nanometers in the case of LiNbO$_3$. Therefore, a large number of excitations are required in order to transfer charges from bright to dark areas, typical distances in interference patterns being on the order of micrometers. Photosensitivity is increased when an electric field is applied. This may be due to the fact that saturation refractive index changes may be magnified by external electric fields. Except in the case of great drift lengths and space charge limitation, however, time constant $\tau$ may be barely dependent on the application of an external electric field, so that the increase in sensitivity normally induced by the field is insufficient for practical applications in the above-mentioned areas.

The reference U.S. Pat. No. 5,521,743 purportedly concerns a photodiode in which a homogeneous write beam causes the avalanche effect resulting in a non-linear increase in sensitivity and induces changes in the refractive index which are caused by thermo-optical effects or by the buildup of electric space charge fields together with the electro-optical effect. The changes are detected not electrically as in the case of the available photodetectors, but optically using a second light beam.

SUMMARY OF THE INVENTION

An exemplary method of the present invention is directed to writing to an optical modulator using space-modulated write beams, which may be implementable at a low cost and allow high sensitivity to be achieved.

An exemplary device of the present invention is directed to implementing in a device, i.e., an optical modulator, a method of writing to an optical modulator using space-modulated write beams, which may be implementable at a low cost and allow high sensitivity to be achieved.

An additional/alternative exemplary method and/or exemplary device of the present invention includes the feature of the increase in sensitivity of the optical modulator illuminated with a light pattern, for example, the image of a mask or of an interference pattern, by applying a high-intensity electric field.

An additional/alternative exemplary method and/or exemplary device of the present invention may be based on the principle of deriving the energy required for the buildup of space charge fields in photorefractive materials not exclusively from light as is customarily done, but by using the electrical energy of an external voltage and current source for this purpose. The electric field intensity in this case is selected to be in a range where an increase in voltage results in a shorter time for the buildup of refractive index changes and thus in a smaller time constant $\tau$. The field intensity may be slightly less than the breakthrough field intensity. Thus, according an additional/alternative exemplary method and/or exemplary device of the present invention, electrical energy may used efficiently instead of light energy for the buildup of the required electric space charge fields. The reduction in time constant τ may be due to the following factors.

First, the reduction in time constant τ may be due to an increase in the charge carrier mobility μ in strong fields. This increases photosensitivity, and a space-modulated write beam may be more efficiently convertible into changes in the refractive index. The term "space modulated" means that modulation may also take place in a two-dimensional surface that is perpendicular to the beam's plane of propagation (i.e., perpendicular to the propagation direction of the light).

In the case of strong electric fields, the free charge carriers may be accelerated to the point that they generate secondary charge carriers via impact ionization ("avalanche effect"). As a result, charge carrier density N may increase, conductivity σ may become higher, time constant τ may decrease, and photosensitivity may increase.

In an additional/alternative exemplary embodiment and/or exemplary method of the present invention, the voltage may be increased to the point that illumination with light induces electric breakthrough. The field intensity above which electric breakthrough occurs may be varied via the illumination. Thus, for example, breakthrough may be selectively caused to occur in bright areas, while breakthrough may be prevented from occurring in dark areas, or vice versa. If the intensity of the electric field applied is carefully selected, this effect can cause a reduction in time constant τ and thus an increase in photosensitivity.

In an alternative/additional exemplary embodiment and/or exemplary method, the space charge pattern generated by light may be enhanced by applying a subsequent external electric field. If a space charge field has already been written and a homogeneous external electric field is additionally applied, electric breakthrough and high current may occur first where the two fields additively overlap, i.e., have the same polarity. In this way, by applying a secondary electric field, the space charge pattern and thus the changes in refractive index may be considerably enhanced. This may also result in a non-linear increase in photosensitivity. The time constant of the buildup of the refractive index pattern after writing is infinite, since no increase in the effect is taking place, and therefore may be reduced considerably by external fields if the above-described effect occurs.

The use of non-homogeneous light patterns may be useful for numerous applications. Thus, illuminating a mask with a homogeneous light pattern and imaging the mask onto the converter (pump wave) may produce space-modulated changes in the refractive index. Illuminating the modulator with a laser beam of a different wavelength (test wave) results in this light beam being space modulated. In addition to intensity modulation, the phase or the polarization of the test wave may be affected. Using an interferometer or a polarizer, such a space modulation of a test wave is convertible into intensity modulation of the test wave. The above-described converter may be used for converting images present as incoherent light into coherent images. Coherent images may allow far more optical image processing methods to be used than do incoherent images. Another application may be wavelength conversion: a light signal present at one wavelength is converted into a signal of another wavelength. The "pump light" may be an X-ray, for example, while the "test light" may be visible light.

In an additional/alternative exemplary embodiment and/or exemplary method of the present invention, interference of two plane waves may result in a light grating having cosinusoidal light distribution. The resulting refractive index pattern may be used for diffracting one of the two light beams. In addition, light of another wavelength may be diffracted if the Bragg condition is fulfilled. A grating written using visible transmitted light may function as a mirror for infrared light in reflection geometry, which, however, only reflects light of specific wavelengths. Components of this type may be useful for telecommunication, e.g., for "wavelength multiplexing" for increasing the transmission capacity of glass fibers.

An alternative/additional exemplary embodiment and/or exemplary method of the present invention concerns the "optical transistor." Transfer of charges may cause a shift in space of the refractive index pattern produced with respect to the light pattern. However, if the converter is illuminated with two plane waves, an interference effect takes place downstream from the converter. There are two light beams downstream from the sample in either direction: the transmitted component of one light beam and the diffracted component of the other. The interference of these light beams may increase the intensity of one beam at the expense of the other beam. This effect, known as "beam coupling," allows the intensity of time-variable weak signals to be amplified. If in this application one of the plane light waves is replaced by an intensity-modulated light wave (image information), the entire image may be enhanced.

An alternative/additional exemplary embodiment and/or exemplary method of the present invention concerns application in holography. The recorded interference pattern of two light beams may be considered a "hologram." In general, the "object wave" or "signal wave" carries information. A second wave, the "reference wave," may often be shaped as a spherical wave or a plane wave. Subsequent illumination of the hologram with the reference wave may produce the original signal wave by diffraction. However, the unchanged reference wave with the same wavelength and the same direction of incidence must be used. Otherwise, diffraction is weak or, in the case of "thick" holograms, may not occur at all. The reason for this is that diffraction can require the Bragg condition to be fulfilled. Often multiple holograms may be received in the converter, so for this purpose the reference wave is slightly changed from one hologram to the other. For example, varying the angle of incidence may be sufficient to have multiple holograms overlap in a volume. These may then be read out consecutively. In this way, high capacity, high read rate data storage devices are implementable.

In an alternative/additional exemplary embodiment and/or exemplary method of the present invention, instead of the above-described data reconstruction, data may also be compared. In a correlator, the stored hologram may be illuminated not with the reference light, but with the signal light. If the signal coincides with the stored data, the reference wave is reconstructed. Then, using the intensity of this wave, the degree of coincidence, i.e., the correlation between stored and current image, may be established. This concept may be used, for example, for image and pattern recognition. The converter body may be then illuminated with an interference pattern that causes changes in the refractive index to record a hologram, the changes in refractive index being non-linearly amplified by applying a high-intensity external electric field.

Exemplary embodiment(s) and/or exemplary method(s) of the present invention may also be used for converting an image from one light wave to another light wave, using a converter body whose optical properties are modified when illuminated with a wave. These modifications may be amplified by applying a strong external electric field, and detected using the second wave.

The applications described as examples are based on illuminating the converter with a light pattern. The common feature of all applications is that by applying strong electric fields the time constant of the changes in refractive index buildup may be reduced and thus photosensitivity may be enhanced.

Another exemplary method may be directed to writing to an optical modulator using electromagnetic write beams, the modulator having a photorefractive converter body in which the space-modulated write beam induces changes in the refractive index, wherein an external voltage is applied to the converter body, the intensity of the external voltage being selected within a voltage range in which the buildup of changes in the refractive index is accelerated by an increase in the charge carrier mobility or charge carrier density. A further exemplary method may include that the converter body is written to using a write beam of non-homogeneous intensity which forms a flat or spatial light pattern within the converter body, the light pattern producing a refractive index pattern. A further exemplary method may include that a voltage whose intensity is slightly less than the breakthrough voltage of the converter body is applied to the converter body. A further exemplary method may include that field intensities of more than 1 kV/cm, in particular up to 500 kV/cm, are applied to generate the voltage. A further exemplary method may include that the non-homogeneity of the write beam is produced by a mask which is placed in the beam path between a beam source emitting the write beam and the converter body. A further exemplary method may include that the mask produces the non-homogeneity by diffraction, refraction, and/or reflection of the write beam. A further exemplary method may include that the non-homogeneity of the write beam writes a hologram into the converter body, which is generated by interference of a write beam with a second beam within the converter body. A further exemplary method may include that wherein the converter body written to using the hologram is illuminated with a read beam which is space modulated by the pattern, in particular in its phase, intensity, and/or polarization. A further exemplary method may include that the space modulation of the read beam is converted in particular by an interferometer or a polarizer into an intensity modulation. A further exemplary method may include that the hologram is illuminated with a read beam whose wavelength differs from that of the write beam, the Bragg condition being fulfilled. A further exemplary method may include that the modulator is illuminated with two interfering write beams which generate a light pattern and thus also a refraction pattern in the converter body, and they are diffracted on the refraction pattern so that one of the write beams is amplified at the expense of the other write beam ("optical transistor"). A further exemplary method may include that one of the light waves has intensity modulation and thus carries image information. A further exemplary method may include that the modulator has a photorefractive oxide crystal, a photorefractive semiconductor crystal, or a photorefractive polymer. Exemplary device(s) for the present invention may include a device for implementing the method according to any of the aforementioned exemplary method(s).

DETAILED DESCRIPTION OF THE DRAWINGS

Figure 1:
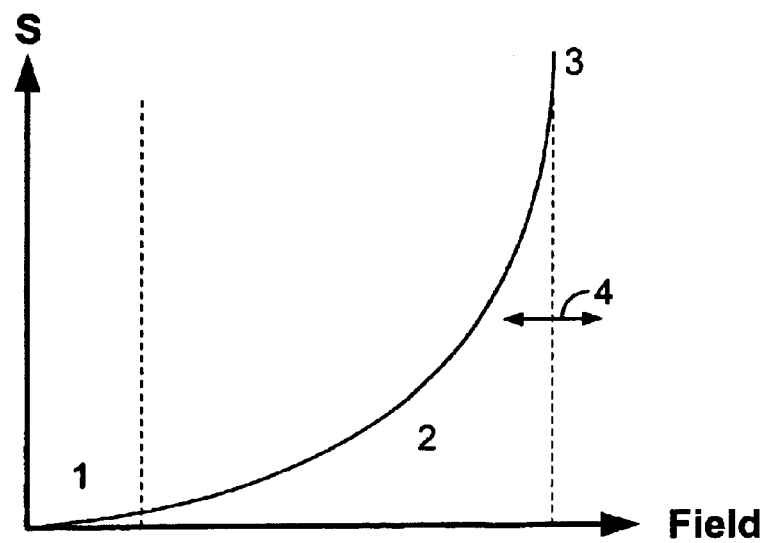
FIG. 1 shows the increase in sensitivity as a function of the voltage.

FIG. 1 shows, in a diagram, an example of how photosensitivity S increases as a function of the intensity of the electric field applied to the converter. The curve begins with a linear area known as "ohmic area" 1. Here S still increases linearly with the field intensity, since S is influenced by the changes in saturation refractive index. However, if electric fields of sufficient intensity are applied for the charge carrier mobility or the density of free charge carriers to be considerably increased, photosensitivity begins to increase particularly rapidly (superlinearly) 2. At very high field intensities, breakthrough finally occurs 3. The breakthrough field intensity depends on the illumination conditions (arrow 4).

As described above, space-modulated illumination may induce breakthrough selectively in the bright or dark areas. The extremely strong currents which flow in this case result in quick space charge pattern buildup and thus rapid (compared to the increase in the external electric field), non-linear increase in photosensitivity S. If an electric space charge field is already present, as described, an additional external electric field may be used to induce breakthrough selectively in those areas where the two fields have the same polarity.

Figure 2A:
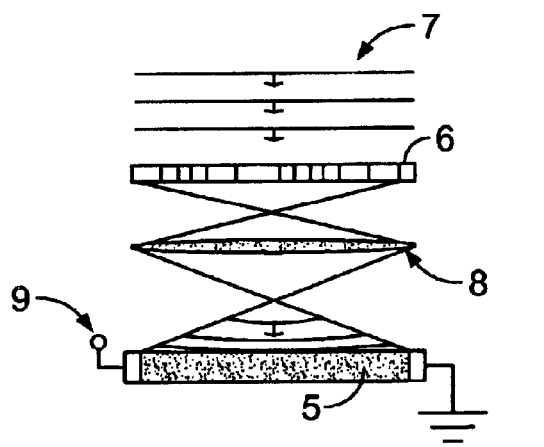
FIGS. 2a and 2b show the illumination of a converter with a light pattern.
Figure 2B:
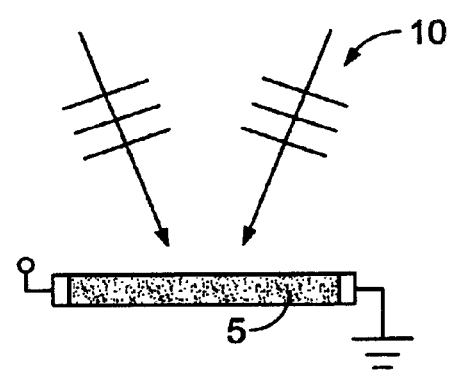

FIG. 2 schematically shows how a converter 5 may be illuminated with a non-homogeneous light distribution. One option is the illumination of a mask 6 with homogeneous light 7 and subsequent imaging of mask 6 on converter 5 (Figure a). In this case the image of mask 6 is projected on converter 5 using a lens 8. A voltage 9 is applied to converter 5. Instead of the single light beam 7 having a well-defined direction, light beams from different directions may strike converter 5 simultaneously.

As an alternative, two or more coherent waves 10 may overlap in the area of converter 5. An intensity pattern is formed due to interference (Figure b).

Figure 3A:
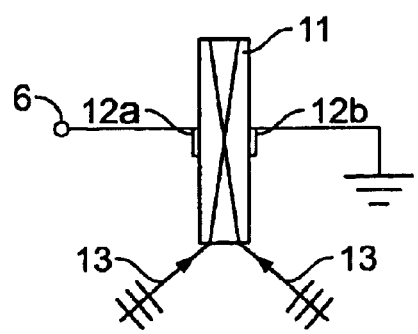
FIGS. 3a and 3b show an exemplary application.
Figure 3B:
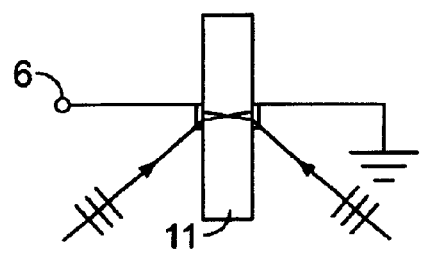

FIG. 3 shows an exemplary embodiment of the practical application of the method. Electrodes 12 are applied to a photorefractive material 11, for example, a photorefractive oxide crystal, a photorefractive semiconductor crystal, or a photorefractive polymer. A high voltage 14 is applied to one electrode 12a; the other electrode 12b is grounded. Then sample 11 is illuminated with two interfering light beams 13, which overlap within sample 11. Depending on the surface through which light beams 13 enter photorefractive material 11, a distinction is made between transmission (FIG. 3a) and reflection (FIG. 3b) geometries. The interference pattern is converted by the photorefractive effect into a charge pattern, field pattern, and thus refractive index pattern. One or more of the above-described effects result in a non-linear increase in photosensitivity S with respect to the external electric field.

The arrangements shown in FIG. 3 may be used for the optical amplification of weak light beams at the expense of the second light beam ("optical transistor," "two-beam coupling"), but also for the amplification of entire images. Additional applications may include holographic storage of images or the comparison of two images, the construction shown in FIG. 3 in this case representing part of an optical correlator.

What is claimed is:

1. A method of writing to an optical modulator using electromagnetic write beams, comprising:
    providing the modulator having a photorefractive converter body;
    providing at least two coherent write beams to induce changes in a refractive index of the converter body;

applying an external voltage to the converter body,
where the external voltage is selected within a voltage range in which a buildup of changes in the refractive index is accelerated by an increase in at least one of a charge carrier mobility and a charge carrier density.

2. The method of claim 1, wherein at least one of the at least two coherent write beams is of non-homogeneous intensity and forms one of a flat and a spatial light pattern within the converter body, the light pattern producing a refractive index pattern.

3. The method of claim 1, wherein the external voltage is slightly less than a breakthrough voltage of the converter body.

4. The method of claim 3, further comprising applying a homogeneous electric field having a field intensity of more than 1 kV/cm to generate the external voltage.

5. The method of claim 3, further comprising applying a field intensity in a range of greater than 1 kV/cm and lesser or equal to 500 kV/cm to generate the external voltage.

6. The method of claim 1, further comprising placing a mask in a beam path between a beam source emitting at least one of the at least two write beams and the converter body, wherein a non-homogeneity of at least one of the at least two write beams is produced by the mask.

7. The method of claim 6, wherein the mask produces the non-homogeneity by at least one of diffraction, refraction, and reflection of at least one of the at least two write beams.

8. The method of claim 1, further comprising writing a hologram into the converter body by a non-homogeneity which is generated by interference of the at least two write beams.

9. The method of claim 8, further comprising:
writing to the converter body using the hologram; and
illuminating the converter body with a read beam which is space modulated in at least one of its phase, intensity, and polarization.

10. The method of claim 9, further comprising converting the space modulation of the read beam by one of an interferometer and a polarizer into an intensity modulation.

11. The method of claim 8, further comprising illuminating the hologram with a read beam whose wavelength differs from that of the at least two write beams, the Bragg condition being fulfilled.

12. The method of claim 1, wherein the modulator has one of a photorefractive oxide crystal, a photorefractive semiconductor crystal, and a photorefractive polymer.

13. A method of writing to an optical modulator using electromagnetic write beams, comprising:
providing the modulator having a photorefractive converter body;
illuminating the modulator with two interfering write beams which generate a light pattern and a refraction pattern in the converter body, and induce changes in a refractive index of the converter body;
diffracting the two interfering write beams on the refraction pattern so that one of the two write beams is amplified at the expense of the respective other write beam; and
applying an external voltage to the converter body,
wherein an intensity of the external voltage is selected within a voltage range in which a buildup of changes in the refractive index is accelerated by an increase in at least one of a charge carrier mobility and a charge carrier density.

14. The method of claim 13, wherein at least one of the two write beams has intensity modulation and thus carries image information.

15. A device for writing to an optical modulator, comprising:
the optical modulator having a photorefractive converter body;
at least two coherent write beams inducing changes in a refractive index of the photorefractive converter body;
an external voltage applicable to the photorefractive converter body,
wherein the external voltage is selected within a voltage range so that a buildup of changes in the refractive index is accelerated by an increase in one of a charge carrier mobility and a charge carrier density.

16. The device of claim 15 wherein the external voltage has an intensity slightly less than a breakthrough voltage of the converter body, and a field intensity in a range between greater than 1 kV/cm and less than or equal to 500 kV/cm is applied to generate the external voltage.

* * * * *